United States Patent
Krauss et al.

(10) Patent No.: US 7,469,613 B2
(45) Date of Patent: Dec. 30, 2008

(54) TWIN-CLUTCH TRANSMISSION

(75) Inventors: Christian Krauss, Köln (DE); Ulrich Eggert, Viersen (DE); Martin Leibbrandt, Bedburg (DE)

(73) Assignee: Getrag Ford Transmissions GmbH, Cologne (DE)

( * ) Notice: Subject to any disclaimer, the term of this patent is extended or adjusted under 35 U.S.C. 154(b) by 143 days.

(21) Appl. No.: 11/406,580

(22) Filed: Apr. 19, 2006

(65) Prior Publication Data

US 2006/0230853 A1 Oct. 19, 2006

(30) Foreign Application Priority Data

Apr. 19, 2005 (EP) .................................. 05103119

(51) Int. Cl.
*F16H 3/38* (2006.01)

(52) U.S. Cl. .............................. 74/340; 74/329; 74/330; 74/331; 74/339; 477/3; 180/65.4; 180/65.7

(58) Field of Classification Search ....................... None
See application file for complete search history.

(56) References Cited

U.S. PATENT DOCUMENTS

| | | | |
|---|---|---|---|
| 6,427,547 B1 | 8/2002 | Bowen | |
| 6,427,549 B1 * | 8/2002 | Bowen | .................. 74/331 |
| 6,490,945 B2 * | 12/2002 | Bowen | .................. 74/339 |
| 6,499,370 B2 | 12/2002 | Bowen | |
| 6,506,139 B2 * | 1/2003 | Hirt et al. | ................. 477/3 |
| 6,634,247 B2 * | 10/2003 | Pels et al. | .................. 74/329 |
| 7,249,537 B2 * | 7/2007 | Lee et al. | ................. 74/661 |
| 2002/0088288 A1 | 7/2002 | Bowen | |
| 2002/0088290 A1 | 7/2002 | Bowen | |
| 2002/0088291 A1 | 7/2002 | Bowen | |
| 2006/0230853 A1 | 10/2006 | Kraus | |

FOREIGN PATENT DOCUMENTS

| | | |
|---|---|---|
| DE | 198 50 549 | 5/2000 |
| DE | 101 60 884 | 6/2003 |

OTHER PUBLICATIONS

Office Action Issued by the United States Patent and Trademark Office for U.S. Appl. No. 11/406,706, dated Mar. 24, 2008.

* cited by examiner

*Primary Examiner*—David D. Le
(74) *Attorney, Agent, or Firm*—Schlee IP International, P.C.; Alexander R. Schlee

(57) ABSTRACT

A twin-clutch transmission, in particular for a motor vehicle, with a twin-clutch arrangement comprising a first and a second clutch, and a first and a second drive unit designed as an electric machine with a stator and a rotor. The rotor of the first drive unit is fixed to an input side of the transmission that is connected to an engine so that it rotates always at the rotational speed of the engine. The twin-clutch transmission can be switched back and forth between a serial and a parallel hybrid mode, these modes being established by means of the first and second drive units. The drive shaft of the second drive unit and the clutches have different rotational axes.

4 Claims, 3 Drawing Sheets

TWIN-CLUTCH TRANSMISSION

This application claims the priority of the European Patent Application EP 05103119.3 having a filing date of Apr. 19, 2005, the entire content of which is herewith incorporated by reference.

BACKGROUND OF THE INVENTION

The invention relates to a twin-clutch transmission, in particular for a motor vehicle.

A twin-clutch transmission which comprises a first clutch and a second clutch which are arranged coaxially with one another and accordingly have a common axis of rotation is known from U.S. Pat. No. 6,499,370, for example. The twin-clutch furthermore comprises a first input shaft and a second input shaft. The first input shaft can be connected to an engine via the first clutch. The second input shaft can be connected to the engine via the second clutch.

A torque can be transmitted from the input shafts to an output shaft via a number of engageable gearwheel pairs. In this connection, a gearwheel pair consists of a fixed wheel and a loose wheel. The loose wheel is in each case assigned a gear-shifting clutch by means of which the loose wheel can be connected in a rotationally fixed manner to the shaft on which the loose wheel is arranged. With the gear-shifting clutch closed, the gearwheel pair transmits a torque from one of the input shafts to the output shaft.

In order to make possible a serial and/or parallel hybrid mode of the twin-clutch transmission, the twin-clutch transmission of U.S. Pat. No. 6,499,370 has a first drive unit and a second drive unit. In this connection, the two drive units are each designed as electric machines which are arranged coaxially with the two clutches and coaxially with the two input shafts.

Owing to the coaxial arrangement of the two clutches and of the two input shafts with the fixed wheels/loose wheels including gear-shifting clutches arranged thereon, and also owing to the electric machines arranged coaxially therewith, the twin-clutch transmission has a comparatively great overall axial length. This can lead to problems on installation in a motor vehicle with a given space availability. The space availability inside the engine space of the motor vehicle is very limited in particular when the twin-clutch transmission is to be mounted together with the engine transversely to the direction of travel. The problem of limited space availability is becoming more serious as a trend toward increasing the number of forward gears can be observed as far as manual transmissions are concerned. As a rule, an additional forward gear means a further gearwheel which is arranged on one of the input shafts and further increases the overall axial length.

A twin-clutch transmission with only one electric machine which can be switched to the first or the second input shaft as required by a switch-over device is known from DE 198 50 549. It is true that it is possible to dispense with one electric machine by virtue of such a switch-over device, but, in comparison with a twin-clutch transmission with two electric machines of which the parallel operation is provided at maximum load, for example, this individual electric machine has to be dimensioned to be larger in order to provide power corresponding to the sum of the individual powers of the two electric machines. However, an electric machine of such a size can also lead to packing problems again.

SUMMARY OF THE INVENTION

An object of the invention is to provide a twin-clutch transmission with two drive units which has a comparatively small overall axial length in spite of a large number of forward gears.

This object is achieved by the twin-clutch transmission with the features of claim 1. Preferred embodiments can be inferred from the subclaims.

By virtue of the fact that the first drive unit is arranged coaxially with the first and second clutches and surrounds the clutches in the radial direction and that the second drive unit has a drive shaft with an axis of rotation which is different from the axis of rotation of the clutches, a manual transmission with a comparatively short overall axial length can be produced. The arrangement of the first drive unit has virtually no influence on the overall axial length if the axial extent of the first drive unit is smaller than the axial extent of the twin-clutch arrangement. The first drive unit is adjacent to the twin-clutch arrangement seen in the radial direction, an inside diameter of the first drive unit corresponding approximately to an outside diameter of the twin-clutch arrangement.

As the drive shaft of the second drive unit does not coincide with the axis of rotation of the two clutches, the second drive shaft can be arranged spatially separately from the clutches and also from the first drive unit. In this connection, the arrangement of the second drive unit is in principle freely selectable.

In a preferred illustrative embodiment, the axis of rotation of the drive shaft of the second drive unit runs parallel at a distance to the axis of rotation of the two clutches. Such an arrangement of the two axes of rotation makes it easier to couple the second drive unit to one of the two input shafts or to the at least one output shaft which usually runs parallel to the input shafts.

In a preferred illustrative embodiment, the first and the second input shafts are arranged coaxially with the axis of rotation of the clutches. In this connection, one of the input shafts is preferably designed as a hollow shaft.

The first drive unit can be designed as an electric machine with a stator and a rotor. In the arrangement according to the invention of the first drive unit, the annular rotor is arranged between the annular stator and the twin-clutch arrangement.

In a preferred illustrative embodiment, the first drive unit is connected to an input side of the twin-clutch arrangement. If the first drive unit is an electric machine with a stator and a rotor, the rotor is in this case connected in a rotationally fixed manner to the engine or to a crankshaft of the engine. Rotor and crankshaft consequently always each have the same rotational speed.

As an alternative to this, the first drive unit can be connected to one of the input shafts. In this case, if an electric machine with a stator and a rotor is again taken as a basis as the drive unit, the rotor is connected to one of the input shafts in a rotationally fixed manner. As far as the transmission is concerned, the first drive unit is thus connected behind the twin-clutch arrangement seen from the engine.

The second drive unit is preferably connected to one of the input shafts. In the illustrative embodiment in which the first drive unit is connected to one of the input shafts, the second drive unit should advantageously be connected to the other input shaft. This affords the possibility of controlling the rotational speed of the two input shafts independently of one another via the respective drive unit. The rotational speed of an input shaft can then be synchronized with the rotational speed of the output shaft, for example, by virtue of which the gear-shifting clutches can be designed as positive clutches without a synchronization unit. Moreover, a torque for supporting the engine can be switched to the input shafts by means of the drive units. Alternatively, it is also possible that the second drive unit is connected to the output shaft instead of to an input shaft.

A gearwheel which meshes with a gearwheel on one of the input shafts is preferably arranged on the drive shaft of the second drive unit. In this connection, the gearwheel on the corresponding input shaft can be a fixed wheel or a loose wheel of a gearwheel pair which is provided for connecting the input shaft to the output shaft. This dispenses with a separate gearwheel for connecting the second drive unit.

As an alternative to this, a chain wheel which is connected via a chain to a chain wheel on one of the input shafts can be arranged on the drive shaft of the drive unit. On account of the chain (length, course), the distance of the second drive unit from the axis of rotation of the input shaft is in principle freely selectable.

The term "chain" is to be understood here in the sense of a closed, circulating pulling means. Correspondingly, a chain wheel means a wheel or a disk which makes possible non-positive or positive connection of the pulling means to the shaft bearing the wheel or the disk.

BRIEF DESCRIPTION OF THE DRAWINGS

The invention is explained in greater detail with reference to the illustrative embodiments shown in the figures, in which.

DETAILED DESCRIPTION OF THE DRAWINGS

Figure 1:
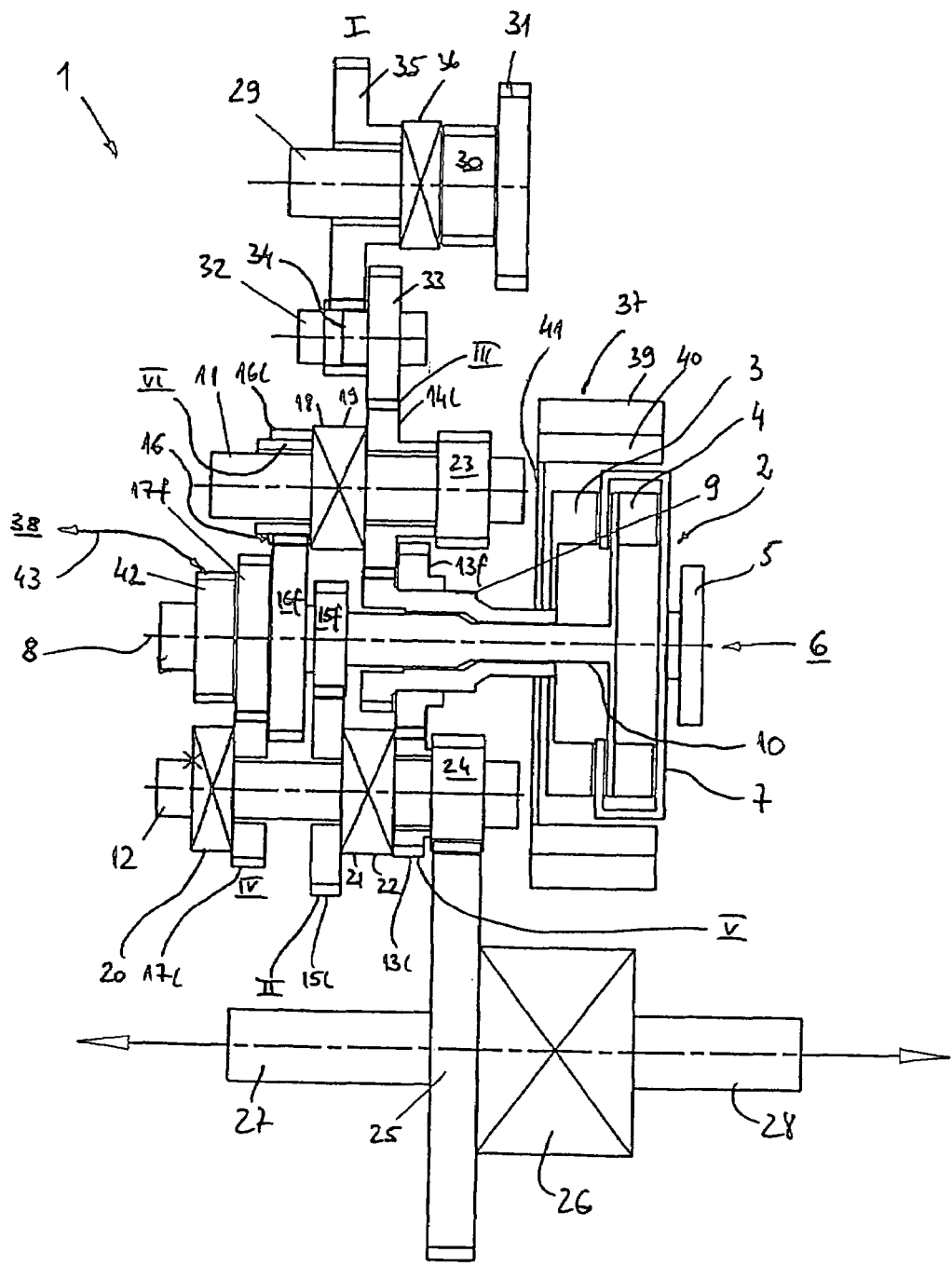
FIG. 1 shows a diagrammatic representation of an illustrative embodiment according to the invention from the side.

FIG. 1 shows a twin-clutch transmission designated as a whole by 1. The twin-clutch transmission 1 has a twin-clutch arrangement 2 with a first clutch 3 and a second clutch 4. An engine 6 only indicated here can be attached to an input side 7 of the twin-clutch arrangement 2 in a rotationally fixed manner at a flange 5.

The first clutch 3 and the second clutch 4 have a common axis of rotation 8. A first input shaft 9 and a second input shaft 10 are arranged coaxially with this axis of rotation 8. Input shaft 9 is designed as a hollow shaft. In a closed state, the first clutch 3 connects the first input shaft 9 to the input side 7 of the twin-clutch arrangement 2, or to the engine 6. The second clutch 4 serves for connecting the second input shaft 10 to the engine 6.

The twin-clutch transmission 1 furthermore has a first output shaft 11 and a second output shaft 12. The respective axes of rotation of the two output shafts 11, 12 run parallel to the axis of rotation 8 but are spaced from it. Five gearwheel pairs 13, 14, 15, 16, 17 are provided for connecting the two input shafts 9, 10 to the two output shafts 11, 12. Each gearwheel pair then comprises in each case a fixed wheel and a loose wheel, the fixed wheel being suffixed with f and the loose wheel with 1. For example, a fixed wheel 13f of the gearwheel pair 13 which meshes with a loose wheel 131 located on the second output shaft 12 is arranged in a rotationally fixed manner on the first input shaft 9. As can be seen in FIG. 1, only the fixed wheels 13f, 14f, 15f, 16f, 17f of the gearwheel pairs 13 to 17 are arranged on the input shafts 9, 10.

A number of gear-shifting clutches 18, 19, 20, 21, 22 are arranged on the output shafts 11, 12. The gear-shifitng clutches are illustrated only diagrammatically here as rectangles with diagonals drawn in, two gear-shifting clutches being represented by only one rectangle in some cases. For example, the gear-shifting clutch 18 serves for connecting its associated loose wheel 161 to the first output shaft 11 in a rotationally fixed manner. Once such a rotationally fixed connection between loose wheel 161 and first output shaft 11 has been made, the gearwheel pair 16 can transmit a torque from the second input shaft 10 to the first output shaft 11.

If the gear-shifting clutch 18 is closed, or engaged, a sixth forward gear of the twin-clutch transmission 1 is engaged. The individual forward gears II, III, IV, V, VI, which are each brought about by one of the gearwheel pairs, are marked by the Roman numerals in FIG. 1.

A torque applied to the output shafts 11, 12 can be transmitted to a ring gearwheel 25 via gearwheels 23, 24 which are in each case connected in a rotationally fixed manner to the first output shaft 11 and the second output shaft 12 respectively. The ring gearwheel then conveys torque applied there to a differential 26 which distributes the torque to the axles 27, 28.

In addition to the first output shaft 11 and the second output shaft 12, the twin-clutch transmission 1 comprises a further output shaft, a third output shaft 29. This third output shaft 29 also has a gearwheel 30 arranged in a rotationally fixed manner which is in engagement with the ring gearwheel 25. Moreover, the third output shaft 29 is connected in a rotationally fixed manner to a parking wheel 31 by means of which the ring gearwheel 25 can be arrested via the gearwheel 30. The gearwheels 23, 24, 30 each have the same diameter and lie in a common plane.

An intermediate shaft 32 is arranged between the first output shaft 11 and the third output shaft 29. The intermediate shaft 32 bears a gearwheel 33 which meshes with the loose wheel 141. A gearwheel 34 which meshes with a loose wheel 35 on the third output shaft 29 is furthermore likewise arranged in a rotationally fixed manner on the intermediate shaft 32. The loose wheel 35 can be connected to the third output shaft 29 in a rotationally fixed manner by means of a gear-shifting clutch 36 assigned to the loose wheel 35. With the gear-shifting clutch 36 engaged, the first forward gear I of the twin-clutch transmission 1 is engaged.

In order to transmit torque in the first forward gear I from the second input shaft 9 to the third output shaft 29, the gear-shifting clutch 19 is opened, or must be open. In this case, the loose wheel 141 transmits no torque to the first output shaft 11 but serves only for torque transmission from the fixed wheel 14f to the gearwheel 33 by means of which the corresponding torque is conveyed to the third output shaft 29 via the intermediate shaft 32, the gearwheel 34 and the loose wheel 35 now connected in a rotationally fixed manner. If on the other hand the third forward gear III is engaged, the loose wheel 141 conveys a torque to the first output shaft 11 on account of the now closed gear-shifting clutch 19. In this connection, gear-shifting clutch 36 must be open.

The twin-clutch transmission 1 furthermore comprises a first drive unit 37 and a second drive unit 38. Both drive units 37, 38 are designed as electric machines. The first drive unit 37, or the first electric machine 37, is arranged coaxially with the clutches 3, 4 and surrounds them in the radial direction. The axial extent of the first electric machine 37 corresponds approximately to the axial dimensions of the clutches 3, 4, or of the twin-clutch arrangement 2, so that the electric machine 37 has no or only very little influence on the overall axial length of the twin-clutch transmission 1.

The first electric machine 37 has a stator 39 and a rotor 40. Stator 39 and rotor 40 are each of annular design, the stator 39 surrounding the rotor 40 from outside in the radial direction. The rotor 40 in turn is adjacent to the twin-clutch arrangement 2 on the outside seen in the radial direction. The rotor 40 is connected to the first input shaft 9 in a rotationally fixed manner via a disk-shaped connection 41.

The second drive unit 38, or the second electric machine 38, is connected to the second input shaft 10 (cf. FIG. 2) via a gearwheel or chain wheel 42 and via a closed pulling means in the form of a chain 43. In FIG. 1, the chain 43 is illustrated diagrammatically as a double arrow which is intended to indicate that a connection exists between the second electric machine 38 and the second input shaft 10 with the gearwheel 42 arranged thereon.

The electric machines 37, 38 can perform very different functions during operation of the twin-clutch transmission 1. For example, they are suitable for synchronizing the rotational speed of the input shaft connected to them in each case with either the rotational speed of an output shaft or a rotational speed of the engine 6. These synchronizations make it possible to design the gear-shifting clutches in the twin-clutch transmission 1, the first clutch 3 and the second clutch 4 as positive clutches without any slip operation. Moreover, the electric machines 37, 38 can be used for starting the engine 6 or for supporting it at high load. Both electric machines 37, 38 can be operated both as a generator and as a motor.

The twin-clutch transmission 1 provides no mechanical reverse gear. Reversing of the motor vehicle equipped with this transmission is effected by one of the two electric machines 37, 38 or both electric machines rotating in a direction of rotation which is opposite to the rotation of the engine 6. For example, the torque of the first electric machine 37 can be used for reversing the vehicle, the force flow being conducted via the gearwheels which are also under load in the first forward gear I.

Figure 2:
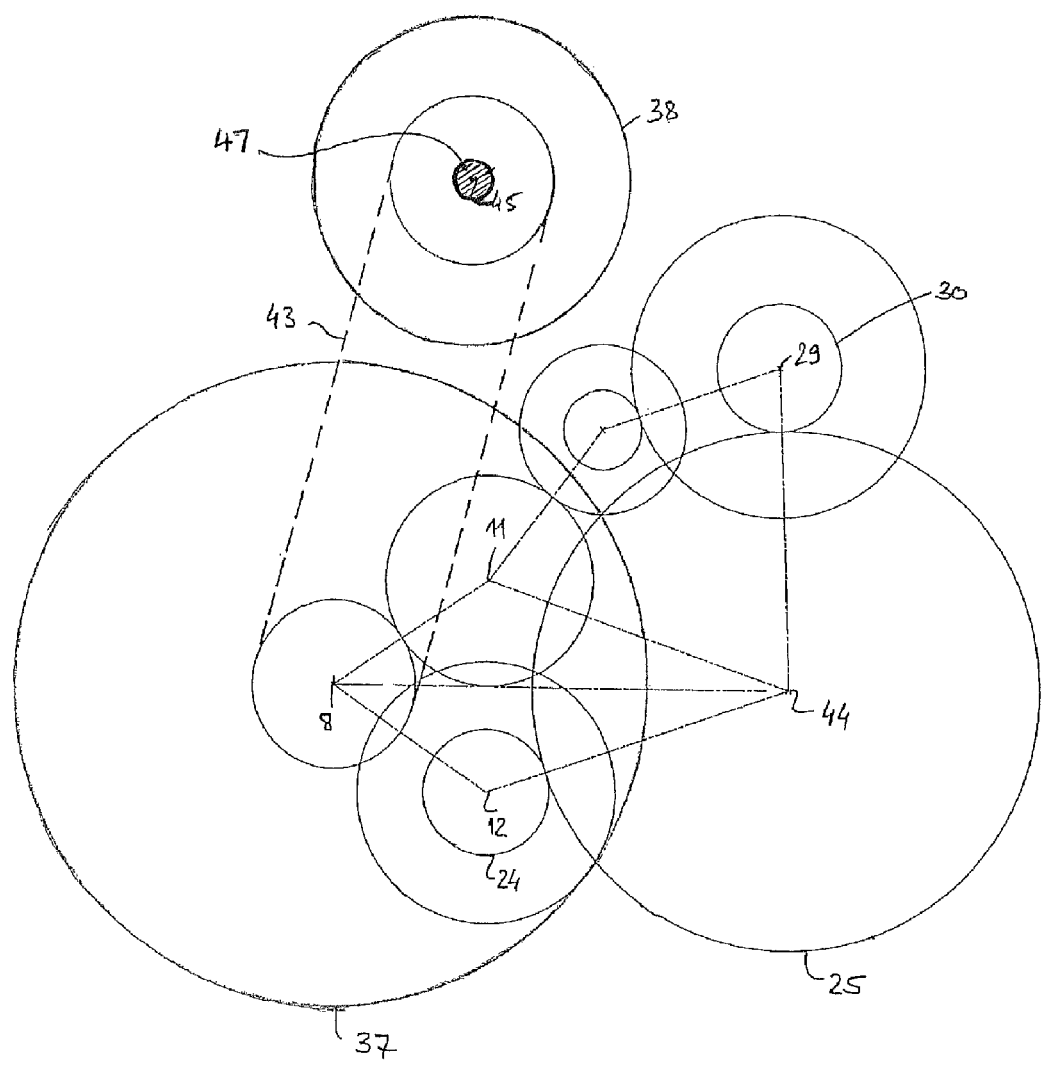
FIG. 2 shows diagrammatically the illustrative embodiment of FIG. 1 in cross section.

FIG. 2 shows how the individual shafts 9, 10, 11, 12, 32, 29 and an axis of rotation 44 of the ring gearwheel 25 are arranged in relation to one another. It is clear furthermore that an axis of rotation 45 of the second electric machine 38 is arranged at a distance from the axis of rotation 8.

Figure 3:
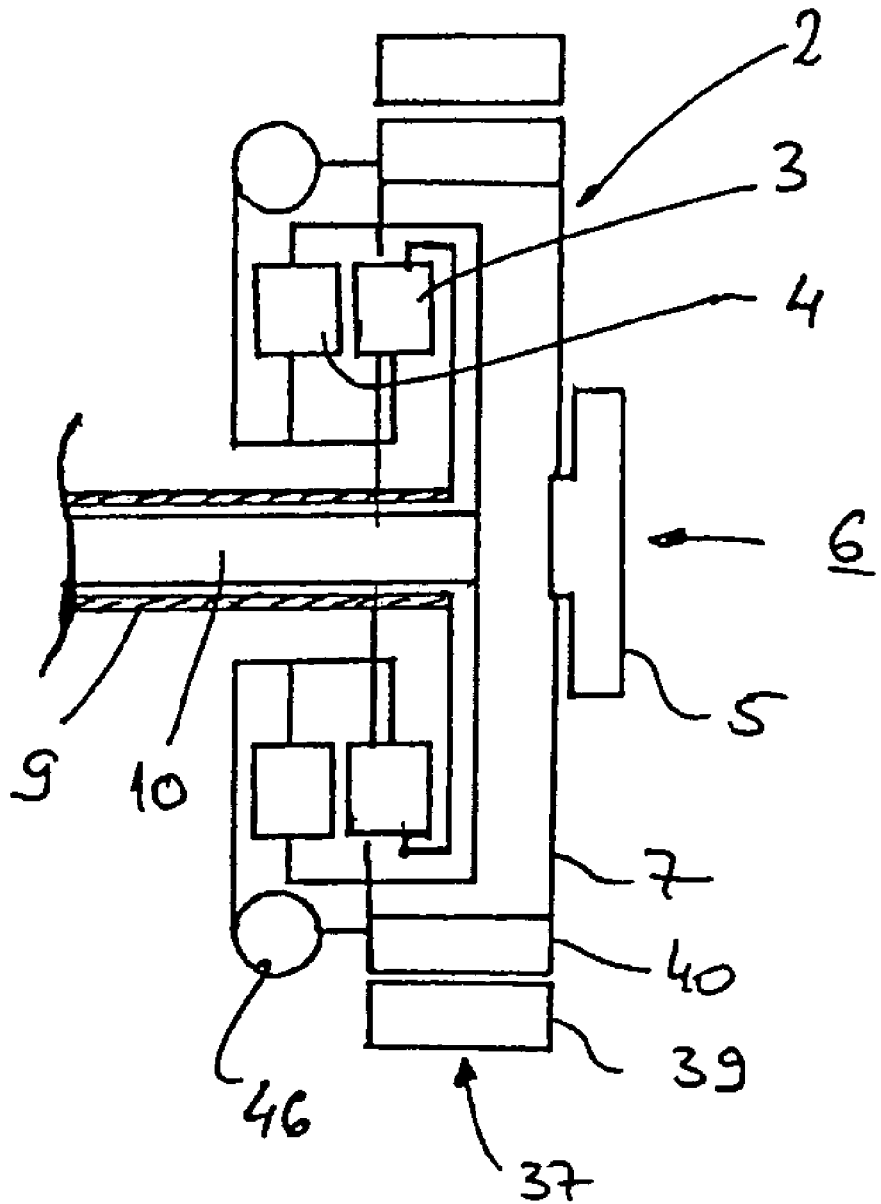
FIG. 3 shows a diagrammatic illustration of a twin-clutch arrangement which differs from the twin-clutch arrangement shown in FIG. 1.

FIG. 3 shows a variant of the twin-clutch arrangement 2 together with the first electric machine 37 which surrounds the arrangement in the radial direction. Whereas the rotor 40 is connected to the first input shaft 9 in a rotationally fixed manner in the illustrative embodiment of FIG. 1, the rotor 40 is here connected to the input side 7 of the twin-clutch arrangement 2 in a rotationally fixed manner. This means that, via the flange 5, the rotor 40 always rotates at the rotational speed of the engine 6. A torsion damper 46 is arranged between the rotor 40 and the two clutches 3, 4.

LIST OF REFERENCE NUMBERS 1 twin-clutch transmission
2 twin-clutch arrangement
3 first clutch
4 second clutch
5 flange
6 engine
7 input side
8 axis of rotation
9 first input shaft
10 second input shaft
11 first output shaft
12 second output shaft
13 gearwheel pair
14 gearwheel pair
15 gearwheel pair
16 gearwheel pair
17 gearwheel pair
18 gear-shifting clutch
19 gear-shifting clutch
20 gear-shifting clutch
21 gear-shifting clutch
22 gear-shifting clutch
23 gearwheel
24 gearwheel
25 ring gearwheel
26 differential
27 axle
28 axle
29 third output shaft
30 gearwheel
31 parking wheel
32 intermediate shaft
33 gearwheel
34 gearwheel
35 loose wheel
36 gear-shifting clutch
37 first drive unit
38 second drive unit
39 stator
40 rotor
41 connection
42 gearwheel or chainwheel
43. chain
44. axis of rotation
45. axis of rotation
46. torsion damper
47. drive shaft

The invention claimed is:

1. A twin-clutch transmission, in particular for a motor vehicle with a twin-clutch arrangement, comprising:
   a first clutch;
   a second clutch;
   an input side;
   a first input shaft;
   a second input shaft;
   at least one output shaft;
   a number of engageable gearwheel pairs for connecting the input shafts to the at least one output shaft;
   a first drive unit that is designed as an electric machine with a stator and a rotor; and
   a second drive unit having a drive shaft rotatable around an axis of rotation; wherein
   the first clutch and the second clutch have a common axis of rotation and the first and the second input shafts are arranged coaxially with the axis of rotation of the clutches;
   the first input shaft is connectable to an engine via the first clutch and the second input shaft is connectable to the engine via the second clutch;
   the twin-clutch transmission can be switched back an forth between a serial and a parallel hybrid mode, said modes being established by means of the first and second drive units;
   the rotor of the first drive unit is connected to the input side such that the rotor and the input side do not rotate relative to each other and the rotor surrounds the clutches in the radial direction;
   the input side is connected to the engine such that the input side always rotates at a rotational speed of the engine; and
   the axis of rotation of the drive shaft of the second drive unit extends in parallel and radially offset to the axis of rotation of the clutches.

2. The twin-clutch transmission as claimed in claim 1, wherein the second drive unit is connected to one of the input shafts.

3. The twin-clutch transmission as claimed in claim 2, wherein a gearwheel which meshes with a gearwheel on one of the input shafts is arranged on the drive shaft of the second drive unit.

4. The twin-clutch transmission as claimed in claim 2, wherein a chain wheel which is connected via a chain to a further chain wheel on one of the input shafts is arranged on the drive shaft of the second drive unit.

* * * * *